(12) United States Patent
Amit

(10) Patent No.: US 11,741,217 B1
(45) Date of Patent: Aug. 29, 2023

(54) SYSTEMS AND METHODS FOR MANAGING MULTIPLE VALID ONE TIME PASSWORD (OTP) FOR A SINGLE IDENTITY

(71) Applicant: TEN ROOT CYBER SECURITY LTD., Tel Aviv (IL)

(72) Inventor: Dor Amit, Tel Aviv (IL)

(73) Assignee: TEN ROOT CYBER SECURITY LTD., Tel Aviv (IL)

( * ) Notice: Subject to any disclaimer, the term of this patent is extended or adjusted under 35 U.S.C. 154(b) by 0 days.

(21) Appl. No.: 17/984,133

(22) Filed: Nov. 9, 2022

(51) Int. Cl.
G06F 21/45 (2013.01)
G06F 21/57 (2013.01)
H04L 9/08 (2006.01)
H04L 9/32 (2006.01)

(52) U.S. Cl.
CPC ............ G06F 21/45 (2013.01); G06F 21/577 (2013.01); H04L 9/0863 (2013.01); H04L 9/3228 (2013.01); G06F 2221/034 (2013.01)

(58) Field of Classification Search
CPC ...... G06F 21/45; H04L 9/0863; H04L 9/3228
See application file for complete search history.

(56) References Cited

U.S. PATENT DOCUMENTS

| | | | | |
|---|---|---|---|---|
| 8,412,928 B1 * | 4/2013 | Bowness | ............. | H04L 63/0838 713/155 |
| 8,832,807 B1 * | 9/2014 | Kuo | ........................ | G06F 21/41 726/8 |
| 9,002,750 B1 * | 4/2015 | Chu | ...................... | H04W 12/04 705/72 |
| 9,172,698 B1 * | 10/2015 | Evans | ................. | H04L 63/0853 |
| 9,967,251 B1 * | 5/2018 | Triandopoulos | .... | H04L 63/0838 |
| 10,091,204 B1 * | 10/2018 | Triandopoulos | ...... | H04L 9/3228 |
| 10,095,859 B2 * | 10/2018 | Miyake | ................. | H04L 9/3228 |
| 10,771,456 B2 * | 9/2020 | Roth | .................... | H04L 63/0838 |
| 2009/0172402 A1 * | 7/2009 | Tran | ..................... | G06Q 20/388 705/40 |
| 2010/0313019 A1 * | 12/2010 | Joubert | ............... | H04L 63/0838 713/168 |
| 2011/0113245 A1 * | 5/2011 | Varadarajan | ............ | G06F 21/34 713/168 |
| 2011/0197266 A1 * | 8/2011 | Chu | ...................... | H04L 9/3228 726/5 |
| 2015/0188913 A1 * | 7/2015 | Teixeron | ............. | H04L 63/0838 713/155 |
| 2016/0105426 A1 * | 4/2016 | Noh | .................... | H04L 63/0838 726/6 |
| 2016/0189138 A1 * | 6/2016 | Hird | ..................... | G06Q 20/385 705/41 |

(Continued)

Primary Examiner — Jason Chiang
(74) Attorney, Agent, or Firm — Snell & Wilmer L.L.P.

(57) ABSTRACT

A computer-implemented method for generating multiple valid OTP (One Time Password) for a single identity using a shared logic, including using an OTP solution based on the shared logic generating and validating multiple valid OTPs that are capable of transferring additional info in a OTP validation process; changing the shared logic in a OTP client and/or in a OTP server dynamically if there is a logic overlapping in the shared logic in a moving factor value and in one or more rules addressed by a rules-based engine; and/or using the OTP solution for one or more distributed disconnected environments only if the shared logic, the moving factor value, and the one or more rules addressed by the rules-based engine are overlapping.

21 Claims, 7 Drawing Sheets

(56) References Cited

U.S. PATENT DOCUMENTS

| | | | |
|---|---|---|---|
| 2017/0126408 A1* | 5/2017 | Van Someren | H04L 9/30 |
| 2018/0019994 A1* | 1/2018 | Chang | H04L 63/0838 |
| 2019/0182232 A1* | 6/2019 | Bowers | H04L 9/3228 |
| 2020/0220866 A1* | 7/2020 | Ramzan | H04L 63/0838 |
| 2020/0252392 A1* | 8/2020 | Mullins | H04L 63/0838 |

\* cited by examiner

OTP is created when using contextual information.

| Profile | Shared Secret | Timestamp | Length | Hash Algor'm | Baseline | Interval | Iter'ns | OTP | Action |
|---|---|---|---|---|---|---|---|---|---|
| Low Risk | 1q2w3e4rLow | Current Date (16/08/2022 23:16) | 3 | HMACSHA256 | 1970-01-01 00:00:00 | 60 | 1 | 310 | Allow authentication with full authorization |
| Medium Risk | 1q2w3e4rMedium | Current Date (16/08/2022 23:16) | 3 | HMACSHA256 | 1970-01-01 00:00:00 | 60 | 2 | 152 | Allow authentication with limited authorization |
| High Risk | 1q2w3e4rHigh | Current Date (16/08/2022 23:16) | 3 | HMACSHA512 | 1970-01-01 00:00:00 | 30 | 3 | 300 | request another authentication factor and approve access with limited authorization |

*FIG. 5*

| Profile | Shared Secret | Timestamp | Length | Hash Algor'm | Baseline | Interval | Iter'ns | OTP | Action |
|---|---|---|---|---|---|---|---|---|---|
| Low Risk | q1w23er4t5y66yLow | 16/08/2022) (23:16 | 3 | HMACSHA256 | 1970-01-01 00:00:00 | 60 | 1 | 310 | Allow authentication with full authorization |
| Medium Risk | q1w23er4t5y66yMedium | 16/08/2022) (23:16 | 3 | HMACSHA256 | 1970-01-01 00:00:00 | 60 | 2 | 152 | Allow authentication with limited authorization |
| High Risk | q1w23er4t5y66yHigh | 16/08/2022) (23:16 | 3 | HMACSHA512 | 1970-01-01 00:00:00 | 30 | 3 | 300 | request another authentication factor and approve access with limited authorization |
| External Env | 1q2w3e4r5tExt | 16/08/2022) (23:16 | 3 | HMACSHA256 | 1970-01-01 00:00:00 | 60 | 1 | 489 | |
| Internal Env | 1q2w3e4r5tInt | 16/08/2022) (23:16 | 3 | HMACSHA512 | 1970-01-01 00:00:00 | 120 | 1 | 234 | |
| Service Account | q1w2e3r4t5y6u7i8o9SA | 16/08/2022) (23:16 | 4 | HMACSHA512 | 1970-01-01 00:00:00 | 600 | 3 | 5830 | |
| Host01 | 1q2w3e4r5t_Host01 | 16/08/2022) (23:16 | 5 | HMACSHA256 | 1970-01-01 00:00:00 | 60 | 1 | 49734 | connecting to one station only |
| Honeypot | q1q1q1q1q23ew23er43User01 | 16/08/2022) (23:16 | 4 | HMACSHA1 | 1970-01-01 00:00:00 | 60 | 1 | 08633 | |
| Honeypot | q1q1q1q1q23ew23er43User02 | 16/08/2022) (23:16 | 3 | HMACSHA256 | 1970-01-01 00:00:00 | 60 | 1 | 144 | |
| | Any | Any | 5 | Any | Any | Any | | Any | |

FIG.7

SYSTEMS AND METHODS FOR MANAGING MULTIPLE VALID ONE TIME PASSWORD (OTP) FOR A SINGLE IDENTITY

FIELD

The disclosure relates in general to the field of cyber security. More specifically, the disclosure relates to a method and system for generating multiple Valid OTP (One Time Password) for a single identity using a shared logic.

The multiple valid OTPs can be identified and addressed uniquely by the authentication and authorization layer without changing anything in the infrastructure supports complex business use-cases with higher efficiency than traditional solutions such as Federated Contextual Authorization, Credentials theft protection and the likes.

BACKGROUND

An OTP is like a password, but it can only be used once or within a specific timeframe. It is often used in combination with a regular password as an additional authentication factor providing extra security.

Users can access an OTP for a given system or service through smartphone apps, a text message, an email a proprietary token etc.

There are a variety of industry standard algorithms that are used in the process of generating OTPs. Sha1, for example, is hashing algorithm and there are several supported hashing algorithms which are part of OTP algorithms. The OTP algorithms uses several inputs but the most important ones which are also method agnostic are the shared secret and moving factor.

While the shared secret does not change, the moving factor does, each time a new OTP is requested. How the moving factor is generated is the differentiator between various OTP implementations.

There are two main types of OTP: HOTP and TOTP. HOTP stands for Hash-based OTP, meaning a Hash Based Message Authentication password or HMAC.

HOTP is an event-based OTP where the moving factor in each password is based on a counter. Each time the HOTP is requested and validated, the moving factor is incremented based on a counter. The password that is generated is valid until you actively request another one and it is validated by the authentication server. RFC 4226 defines standard implementation of HOTP. (https)://datatracker.ietf.org/doc/html/rfc4226).

The OTP generator and the server are synced each time the password is validated, and the user gains access.

Time-based One-time Password (TOTP) is a time-based OTP. The seed for TOTP is static, just like in HOTP, but the moving factor in a TOTP is time-based rather than counter based.

The amount of time in which each password is valid is called a "TimeStep". For example: TimeStep may be set to 60 seconds. If you have not used your password within that window, it will no longer be valid, and a new request is needed to authenticate. RFC 6238 defines standard implementation of TOTP. (https://datatracker.ietf.org/doc/html/rfc6238).

"OTP Generator (Client)" is the component that generates the OTP for the client to use in the authentication process.

"OTP generator and validator server" is the component that validate the OTP created by the OTP generator (client). The server OTP generator is identical to the Client OTP generator.

"OTP solutions" are implemented using static shared information on both the client and the server side in order to generate the same OTP in OTP Generator (Client) and OTP Server.

In TOTP that follows RFC 6238, some of the shared information used by the algorithm to generate the OTP are:

"Seed" also known as "Shared Secret". Can be an identical string like "1q2w3e4r5t6y7u8i"

"TimeStep"/Interval is an OTP validity interval. May be set to between 30 to 90 seconds.

"Hashing algorithm" is used for the OTP calculation.

The solution of this disclosure resolves these and any other problems that will be apparent.

SUMMARY

The disclosed solution of this disclosure is a system establishing an OTP mechanism that relies on a "Shared Logic" that can match multiple valid OTP. Instead of using static shared information, it uses a pattern that results in several compatible values generating or validating several different OTP. Multiple valid OTP values may be used to transfer additional information in the authentication process such as context, etc.

A system for generating multiple valid OTP (One Time Password) for a single identity/user, using a shared logic.

The system comprising: at least one data processor, memory storing instructions that when executed by at least one data processor, perform the following operations: using an OTP solution based on shared logic generating and validating multiple valid OTPs that are capable of transferring additional info in the OTP validation process, other than Boolean (valid\not valid, suitable for limited business use cases such as authentication); changing the shared logic in the OTP Client and/or in the OTP Server dynamically and independently providing that there is a logic overlapping in the shared logic, in the moving factor value and in the rules addressed by the rules-based engine; using the same OTP for distributed disconnected environments providing that they have overlapping shared logic, moving factor value and rules addressed by the rules-based engine; using valid OTP for non-valid requests with dedicated custom actions supporting complex business use cases such as OTP honeypot, being an OTP deception mechanism that validates non-valid requests that may be issued by an attacker to reveal his identity, techniques, incentives and slow him down. The applied actions after OTP validation of non-valid request may include redirecting the attacker to a sandbox instead of the desired target after fake successful authentication, raising an alert, requesting additional data to approve authentication etc.; using recursively an OTP generation process output in another OTP generation process input creating a derived chained OTP and supporting password rotation business use case; implementing a contextual authorization business use case in which the shared secret is affected by the risk score and/or by the risk score ID, either fully or combined with a static value.

In some aspects, the shared logic of the system is composed of different built-in data arguments composing the OTP according to its RFC (TOTP\HOTP etc.).

In some aspects, the shared logic may also be composed of a number of Iterations defining the chained OTP recursion levels and/or may be expanded with additional factors and/or enhance the existing ones, such as future more advanced hashing algorithm.

In some aspects, the shared logic definition and the actions performed upon specific OTP\successful\unsuccessful OTP Validation, defined in the rule-based engine, do not require any changes to existing MFA\OTP solutions, only integration that is much easier to establish and maintain.

In some aspects, there is a distinction between OTP validation, OTP authentication process and further custom actions. OTP's successful validation may result an "Authentication Denied" and vice versa.

In some aspects, a computer-implemented method is disclosed for generating multiple valid OTP (One Time Password) for a single identity using a shared logic. In some aspects, the method can include using an OTP solution based on the shared logic generating and validating multiple valid OTPs configured to transfer additional info in a OTP validation process; dynamically changing the shared logic in a OTP client and/or in a OTP server and if there is a logic overlapping in the shared logic, a moving factor value, and one or more rules addressed by a rules-based engine; using the OTP solution for one or more distributed disconnected environments only if the shared logic, the moving factor value, and the one or more rules addressed by the rules-based engine are overlapping; using valid OTP for non-valid requests with one or more dedicated custom actions supporting complex business use cases, wherein the one or more dedicated custom actions comprise redirecting an attacker to a sandbox instead of a desired target after fake successful authentication, raising an alert, and/or requesting additional data to approve authentication; using recursively an OTP generation process output in another OTP generation process input creating a derived chained OTP; and implementing a contextual authorization business use case in which a shared secret is affected by a risk score and/or by a risk score ID, at least partially combined with a static value In some aspects, the one more dedicated custom actions supporting complex business use cases comprise at least a OTP honeypot.

In some aspects, the shared logic comprises different built-in data arguments comprising the OTP solution according to a time-based one-time password (TOTP) and/or one-time password algorithm (HOTP).

In some aspects, the shared logic comprises a plurality of Iterations defining a plurality of derived chained OTP recursion levels. The shared logic can be configured to be expanded with additional factors and/or enhance existing factors.

In some aspects, the shared logic includes a plurality of Iterations defining a plurality of derived chained OTP recursion levels.

In some aspects, the shared logic is configured to be expanded with additional factors and/or enhance existing factors.

In some aspects, a definition of the shared logic and one or more actions performed upon successful specific OTP validation defined in the rule-based engine do not require any changes to a multi-factor authentication and/or the OTP solution apart from integration.

In some aspects, there is a distinction between the OTP validation process, an OTP authentication process of the operations, and the one or more dedicated custom actions, whereas a successful validation of the OTP validation process results in an authentication denied output.

In some aspects, a system is disclosed for generating multiple valid OTP (One Time Password) using a shared logic. The system can include at least one data processor and memory storing instructions that when executed by at least one data processor, performing operations including using an OTP solution based on the shared logic generating and validating multiple valid OTPs configured to transfer additional info in a OTP validation process; dynamically changing the shared logic in a OTP client and/or in a OTP server if there is a logic overlapping in the shared logic, a moving factor value, and one or more rules addressed by a rules-based engine; using the OTP solution for one or more distributed disconnected environments only if the shared logic, the moving factor value, and the one or more rules addressed by the rules-based engine are overlapping; using valid OTP for non-valid requests with one or more dedicated custom actions supporting complex business use cases, wherein the one or more dedicated custom actions include redirecting an attacker to a sandbox instead of a desired target after fake successful authentication, raising an alert, and/or requesting additional data to approve authentication; using recursively an OTP generation process output in another OTP generation process input creating a derived chained OTP; and implementing a contextual authorization business use case in which a shared secret is affected by a risk score and/or by a risk score identification (ID) fully or partially combined with a static value.

In some aspects, the operations further include supporting password rotation business use case.

In some aspects, the one more dedicated custom actions supporting complex business use cases include at least a OTP honeypot.

In some aspects, the shared logic includes different built-in data arguments including the OTP solution according to a time-based one-time password (TOTP) and/or one-time password algorithm (HOTP).

In some aspects, the shared logic includes a plurality of Iterations defining a plurality of derived chained OTP recursion levels.

In some aspects, the shared logic is configured to be expanded with additional factors and/or enhance existing factors.

In some aspects, a definition of the shared logic and one or more actions performed upon successful specific OTP validation defined in the rule-based engine do not require any changes to a multi-factor authentication and/or the OTP solution apart from integration.

In some aspects, a definition of the shared logic and one or more actions performed upon unsuccessful specific OTP validation defined in the rule-based engine do not require any changes to a multi-factor authentication and/or the OTP solution apart from integration.

In some aspects, there is a distinction between the OTP validation process, an OTP authentication process of the operations, and the one or more dedicated custom actions, whereas a successful validation of the OTP validation process results in an authentication denied output.

In some aspects, the step of using the OTP solution based on shared logic generating and validating multiple valid OTPs that are capable of transferring additional info in the OTP validation process other than Boolean.

In some aspects, a non-transitory computer-readable medium is disclosed storing instructions that, when executed by a processor, cause the processor to perform any herein disclosed method for generating multiple valid OTP (One Time Password).

Other objects and advantages of the disclosure become apparent as the description proceeds.

BRIEF DESCRIPTION OF THE FIGURES

FIG. 5 is a table showing how an OTP is created when using contextual information.

FIG. 7 is a table showing the creation of OTP when using contextual information in an example embodiment.

DETAILED DESCRIPTION

Figures 1A, 1B:
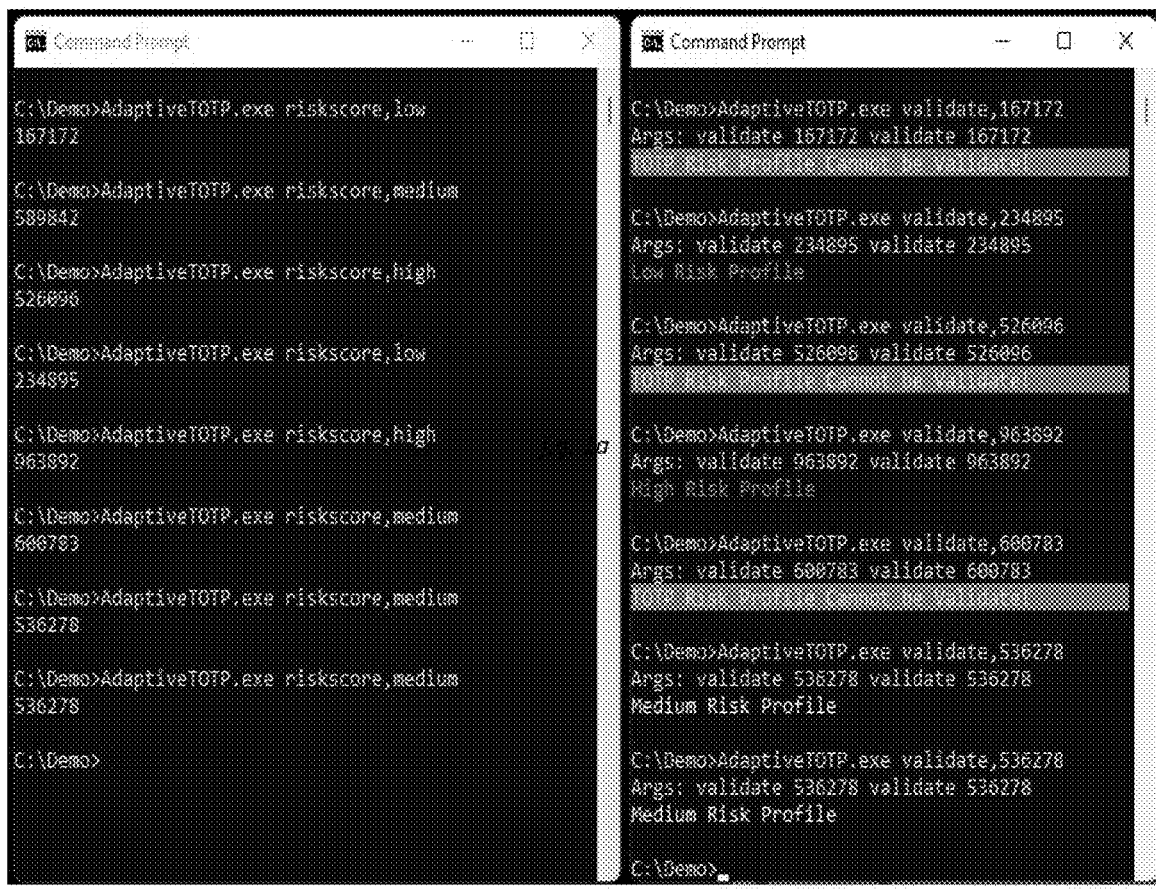
FIGS. 1A and 1B show example screenshots displaying the results of different generated OTPs when using the system.

In the following detailed description, numerous specific details are set forth in order to provide a thorough understanding of the solution of this disclosure. However, it will be understood by those skilled in the art that the present solution of this disclosure may be practiced without these specific details. In other instances, well-known methods, procedures, and components, modules, units and/or circuits have not been described in detail so as not to obscure the solution of this disclosure. Some features or elements described with respect to one embodiment may be combined with features or elements described with respect to other embodiments. For the sake of clarity, discussion of same or similar features or elements may not be repeated.

Although embodiments of the solution of this disclosure are not limited in this regard, discussions utilizing terms such as, for example, "controlling" "processing," "computing," "calculating," "determining," "establishing", "analyzing", "checking", "setting", "receiving", or the like, may refer to operation(s) and/or process(es) of a controller, a computer, a computing platform, a computing system, a cloud computing system or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Unless explicitly stated, the method embodiments described herein are not constrained to a particular order or sequence. Additionally, some of the described method embodiments or elements thereof can occur or be performed simultaneously, at the same point in time, or concurrently.

Reference in the specification to "one embodiment", "an embodiment", "some embodiments" or "other embodiments" means that a particular feature, structure, or characteristic described in connection with the embodiments is included in at least one embodiment, but not necessarily all embodiments. It is understood that the phraseology and terminology employed herein is not to be construed as limiting and are for descriptive purpose only. Most of the described embodiments are based on examples and do not rely to other embodiments unless specifically stated.

The present disclosure relates to the field of cyber security, disclosing a method and system for generating multiple valid OTPs for a single identity that can be identified and addressed uniquely by the authorization layer without changing anything in the infrastructure.

The system introduces several layers of protection. At the most basic level, as shown in example screenshots of FIGS. 1A and 1B, the user turns to the service that issues a one-time password, various characteristics of the user are checked, and a risk level is set for him. For example, in TOTP, user receives back a password that is valid for a certain period of time, (for example: 60 seconds). The user can contact the service several times at the same time period and according to different level of risk, (The contextual information), may receive several different one-time passwords, all of which are valid (see FIG. 1A). The user receives only 1 OTP per request. Different requests may generate different valid OTPs.

In the event that the time allotted for the TOTP has passed, or the TOTP was incorrect, in both cases, the TOTP is either no longer valid or has never been valid, and therefore its validation will fail and return the red lines, (see FIG. 1B).

FIG. 1B simulates the server system that should validate the one-time password(s) and see that they are normal and define their classification. There is no connection between the two screens (FIG. 1A and FIG. 1B). They may run completely detached from one another on the basis of the shared logic that is applied to it, generates the one-time password OTP.

In TOTP that follows RFC 6238, some of shared information is used by the algorithm to generate the OTP.

The disclosure establishes an OTP system that relies on "Shared Logic" that can match multiple valid OTP.

The best way to explain the solution of this disclosure is by examples. Therefore, each explanation is followed by an example and all examples that include interval/TimeStep, are examples of private use case of TOTP.

Figure 2:
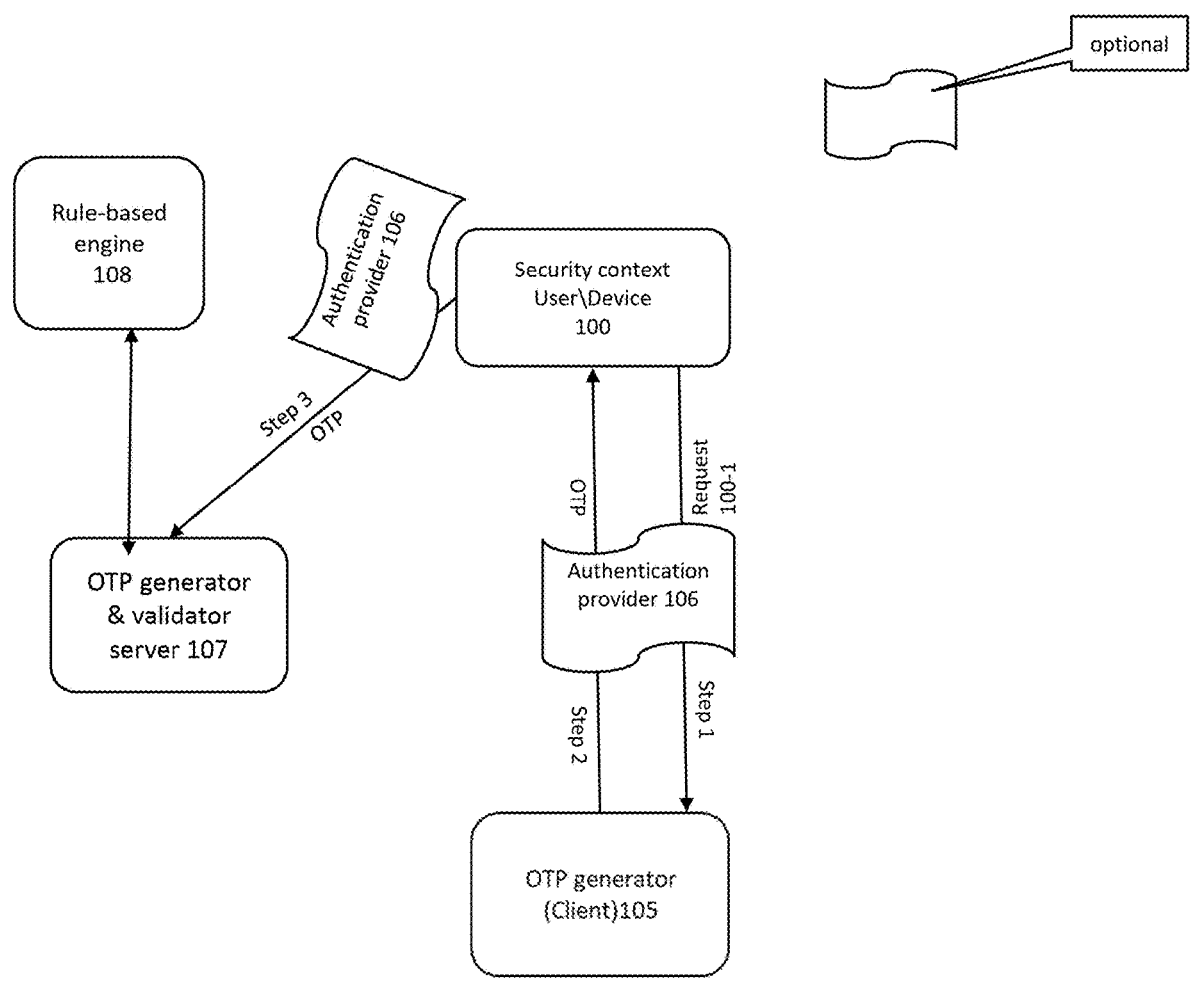
FIG. 2 is an OTP flowchart showing the authentication phase in one embodiment of the system.

FIG. 2 depicts the basic embodiment of the disclosure. OTP generator (Client) 105 and OTP Server 107 agree on a shared logic (pattern) that defines the different factors needed to generate an OTP. For Example: TimeStep: 30 or 60; shared secret: 1q2w3e4rLow; 1q2w3e4rMedium; 1q2w3e4rHigh (see table in FIG. 5). In contextual authorization the shared secret is affected by the risk score and/or by the risk score ID, either fully or combined with a static value. For example, in FIG. 5: 1q2w3e4rLow=1q2w3e4r=static part of the shared secret; Low=risk ID. The risk score is a quantity value that enables numeric quantitative comparison. For example: if the risk score is 5, it means that it is less than 10 and higher than 1. A risk score identification (ID) defines the level of risk as the unique value identifier being the basis for allowed actions. For example, external perimeter access or internal perimeter access. The level of measure is in the differentiation and not in quantitative.

Figure 3:
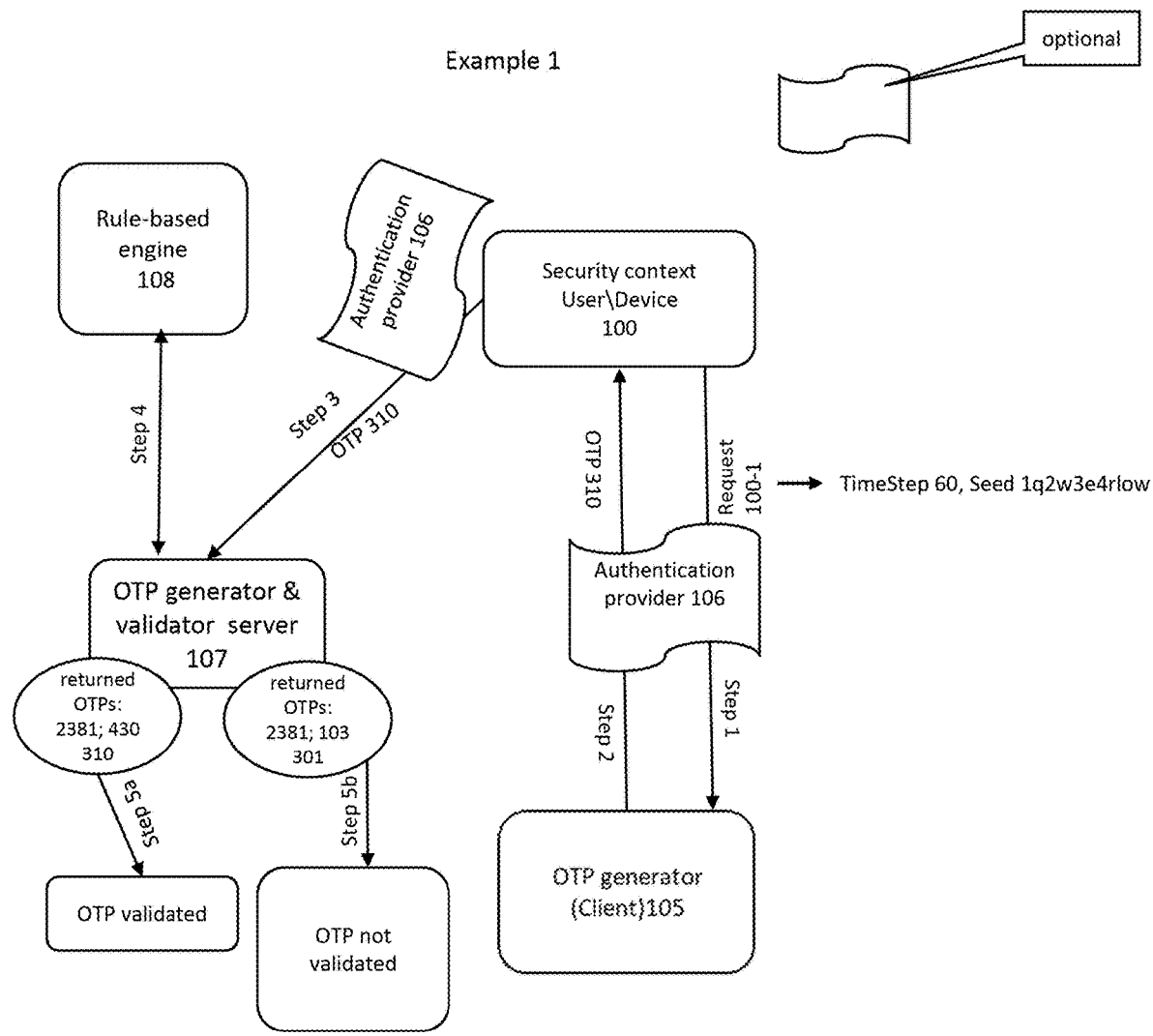
FIG. 3 is an example depicting the embodiment of FIG. 2.

FIG. 3 is an example of the embodiment of FIG. 2. Security context User\Device100 sends request 100-1 to OTP generator (Client) 105 (step 1), either directly or via an authentication provider 106. Request100-1 contains custom information that may also be entered directly by the user to be used to generate the OTP. In example 1 (FIG. 3) OTP generator (Client) 105, generates the OTP 310 out of the passed information request 100-1: TimeStep 60, Seed 1q2w3e4rlow. The OTP 310 (step 2) is passed to security context User\Device100 (either through authentication provider 106 or directly). Security context User\Device100 passes the received OTP 310 to OTP server 107, where it is checked for matches against the OTPs generated in real-time based on the precalculated shared Logic patterns existed in the Rule-based engine 108. For both, OTP generator (Client) 105 and OTP server 107, a set of variable values is required that needs to be given a certain value. For example: hash Algorithm, baseline, interval, Iterations etc., and if these values are not passed on to OTP generator (Client) 105 and OTP server 107, those values will be agreed default values entered the system.

Rule-based engine 108 may return several OTPs, (step 4), but unless at least one of the OTPs is 310, the OTP validation will fail, and the resulting action defined by Rule-based engine 108, is that the authentication will not be approved. For example, Rule-based engine 108 returns the following OTPs: 2381; 430; 310, the authentication will be approved (step 5*a*) since the OTP 310 is one of the returned OTPs. But if the returned OTPs are for example: 2381; 103; 301, the OTP validation will fail and the authentication will not be approved, (step 5*b*) or force User/Device 100 to use an additional authentication factor (MFA, usually with a single valid OTP), or any other custom action defined by Rule-based engine 108.

OTP server107 checks if the received OTP matches any of the OTPs generated by OTP generator and validator server 107 and in addition to Approve\Deny the validation attempt, as explained above, it may apply custom pre-defined logic, (defined by Rule-based engine 108), depending on the specific OTP sent (aka: Contextual Authorization).

Rule-based engine 108 is a standalone feature that may be located anywhere in the system not necessarily at the same location but with ability to interconnect, directly by proxy with OTP generator and validator server 107.

It is to be understood that there is a distinct separation between the validation of the OTP, the authentication process and the action or actions permitted (or not permitted afterwards). For example, what kind of actions are permitted to be performed by the user, whose OTP was validated. Is he permitted to read all files, a specific kind of files, to add or amend data etc. There may be an OTP that has not undergone the validation process for various reasons (the time period allowed in the TOTP has passed, the password is incorrect or belongs to a "blacklist") and still the authentication process will be possible. Equally there may be OTP that will go through the validation process (i.e. —corresponding to the template created on the OTP generator and validator server 107) and the authentication attempt will be denied (e.g., for being in the "blacklist" of the deception mechanism), as further explained hereunder.

The system defines the shared logic using various methods including REGEX\Math Formulas and may be combined with a pre-shared secret. For Example: the pre-shared secret abcd and a number from 1-10 corresponding to the regex pattern "abcd"$(10|?[9-1]). (An example of open-source utility such as Python EXREX can be used to calculate all possible values (see: https://github.com/asciimoo/exrex).

Figure 6:
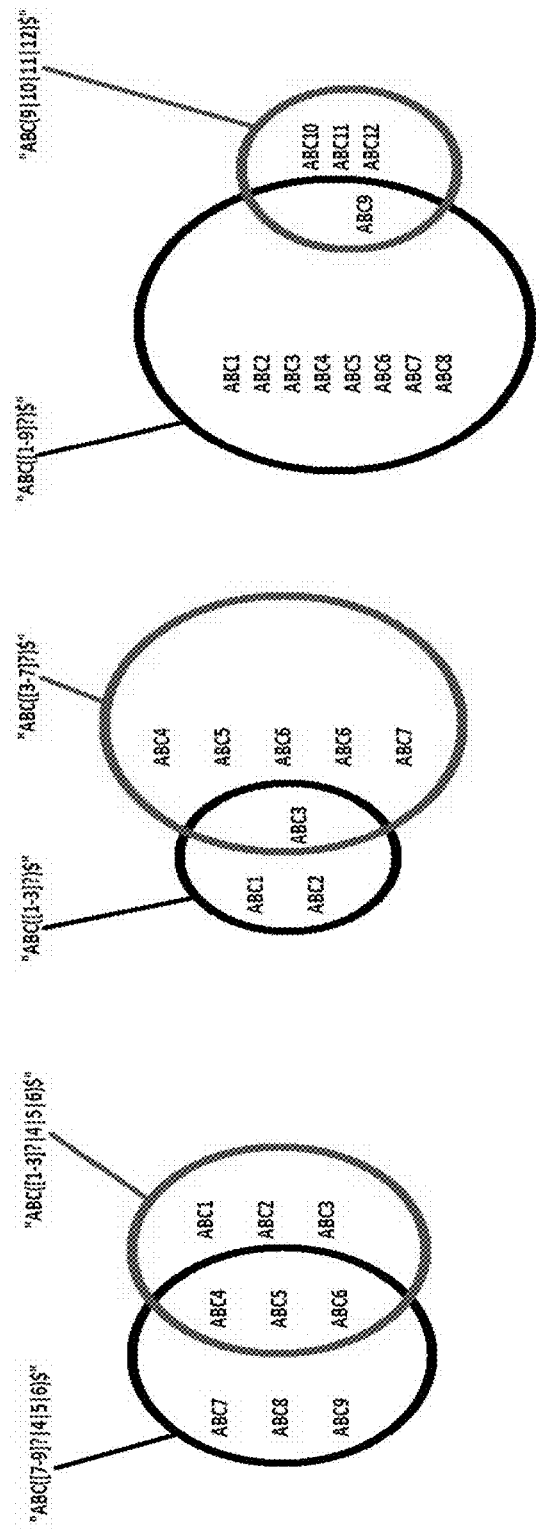
FIG. 6 depicts a simulation of overlapping.

OTP server107\OTP generator (client)105 perform independently from one another. As long as there is an overlapping of the shared logic in OTP generator (client)105 and in OTP server107, the OTP may be considered valid (see examples in FIG. 6).

Figure 4:
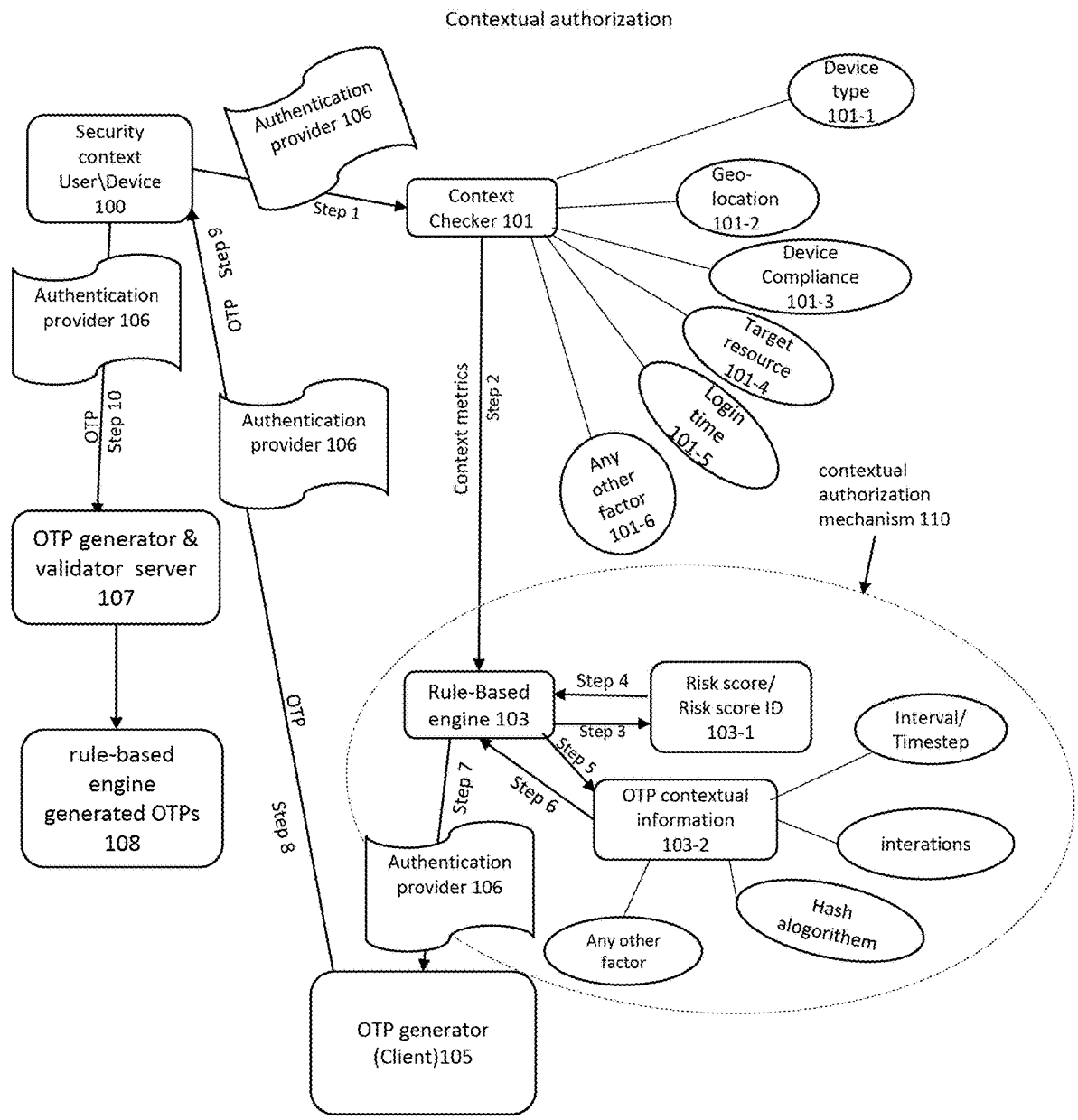
FIG. 4 is an OTP flowchart showing another embodiment of the authentication and authorization phase using contextual information.

In another embodiment as depicted in FIG. 4, contextual authorization is applied.

In the pre-authentication phase, the connection attempt goes to Context Checker101 (step 1), either by authentication provider 106 or directly from Security context User\Device100. The context metrics of context checked 101 are defined according to specifications and level of security required by the establishment that uses the system. Among the common context metrics are device type 101-1; geo-location101-2; device compliance101-3; target resource101-4; Login time101-5 and/or any other essential context metrics establishment related ("context metrics").

In step 2 the context metrics is passed to rule-based engine 103. Rule base engine 103 is generating the data set for the OTP generator (client)105 based on the OTP contextual information received from OTP contextual information 103-2 and from the risk score \risk score ID 103-1.

Rule base engine 103, transfers to risk score \risk score ID 103-1 (step 3) the context metrics and receives from risk score \risk score ID 103-1 the risk score \risk score ID (step 4) and transfers to OTP contextual information103-2 (step 5) the context metrics and the risk score \risk score ID to obtain the necessary information to generate the data set.

OTP contextual information103-2 analysis of the contextual information, and the risk score\risk score ID is sending the information (step 6) to rule-based engine 103 for creating data set for OTP generator (client)105, the factors may be, for example:

Interval/TimeStep—The interval the TOTP is valid for. Default is 60 seconds (As described in RFC 6238 for TOTP).

Hash Algorithm—The Hash Algorithm is part of the procedure generating OTPs (As described in RFC 6238 for TOTP).

Iterations—Number of iterations that uses the OTP generation process output as part of OTP generation process input both being part of the Shared secret, and/or any other essential factor establishment related (chained OTP).

In step 7, all above information creates the data set in rule-based engine 103 and being passed to OTP generator (Client)105 to generate an OTP that is passed, directly (step 8) or by authentication provider 106 (step 9) to Security context user/Device 100. Security context user/Device 100 passes the OTP either directly or by authentication provider (step 10) to OTP generator validator server 107. for example, see table in FIG. 5.

If the authentication is approved and contextual authorization mechanism 110 is implemented as well, the evaluated context from the pre-authentication step, is being transferred to a rule-based engine generated OTPs 108 that applies custom authorization policy. (Such as limited access to resources, enhanced activity auditing etc.)

In order to share the evaluated context in distributed non-connected environment such as in an organization with air gapped data center and cloud resources, the Shared logic method is applied.

One example of the problematic situation in organization with air gapped data center and cloud resources: A user tries to log-on into the organizational network, (e.g., "Active Directory"), in an air gapped environment during off hours. The connection is evaluated as risky and in the same time user establishes separate log-on into the cloud Environment. User's authentication context either needs to be re-evaluate, ignored, or transferred in a non-secure manner.

Even in the same environment, in case there are multiple pre-configured security profiles that corresponds to different conditions, without the Shared logic method there is no way of transparently passing the desired security profile in the authentication phase, so the context or "conditions" still need to be re-evaluated in the pre-authentication phase in order to apply the correct policy.

For example, if there are two security profiles: (1) log-on during work hours 09:00-18:00 and, (2) log-on out of this timeframe. In order to apply the correct contextual authorization policy, during each log-on (Pre-authentication attempt) the log-on time condition needs to be evaluated on each log-on attempt.

Using the Shared logic method allows to implement contextual authentication\authorization solution that overcomes those challenges since the OTP can hold additional information such as the user context ID. So global consistent risk factors (Like log-on time) may only be evaluated once.

In yet another embodiment local password rotation is based on shared logic including chained OTP. In this case, implementing chained OTP into the shared logic implements a more secure password rotation solution for service accounts and local privileged accounts.

One challenge of Implementing Local password rotation mechanism in which the OTP generator (Client)105 resides on the local system or central Server\Service, is that if the SID (an initial value from which the password the is derived) is compromised, the attacker may gain control on future and current rotated passwords and this mechanism may be compromised.

If the SID is temporary and rotates itself, then compromising of the SID is less risky and gives the attacker a shorter time frame to compromise the environment using the compromised password. The logic behind the above methos, resembles to the logic of "certificate chain", (A certificate chain is an ordered list of certificates that enable the receiver to verify that the sender is trustworthy).

The idea behind chained OTP is, that the shared logic, (including the number of iterations), is known to both the OTP generator (Client)105 and OTP generator and validator server 107.

Existing OTP solutions are susceptible to credential theft threats such as password spraying\Guessing or compromising the OTP shared secret.

The shared logic concept can define a pattern which produces "valid" OTP that upon validation, it will be classified as a malicious attempt just like a Honeypot. (an example of some different possibilities may be seen in the last 3 rows of the table in FIG. 7).

The Rule-Based engine 103 may assign a policy that blocks the current\future authentication attempt for a given time, using a moderator for authenticating approval, raising an alert, approving authentication into a decoy environment/system etc., In yet another embodiment, a complex contextual authentication\authorization (Conditional access) is implemented. Conditional access solution which implements contextual authorization are usually limited to work in the following pattern:

1. In the Pre authentication phase, the user's context and the derived risk level is being evaluated.

2. The user is assigned a risk score that allows\denies the authentication attempt or forces the user to employ an additional authentication factor (MFA, usually with a single valid OTP)

3. If the authentication is approved and contextual authorization mechanism is implemented as well, the evaluated context from the pre-authentication step is being transferred to a rule-based engine that applies custom authorization policy, such as limited access to resources, enhanced activity auditing etc.

The main challenge in this model, is that the user contextual info\risk score has to be saved and transferred to authorization layer or be re-evaluated by it in every logon attempt. Therefore, the (contextual) authorization layer has to have a connection to the conditional access layer, (which has previously evaluated user context and saved it), or to have a way to access the user\device and evaluate it directly in Realtime.

In case of a distributed disconnected environment—the above procedure has to be performed for every user's logon attempt.

In yet another embodiment, where the use case assumes that target environment composed of multiple distributed disconnected systems: A, B, C . . . N, each system has the same OTP Server validator with the same shared logic. Part of the shared logic is the system identity. When User\Device100 wants to connect to system A it sends a request to the OTP generator (client)/105 and is passed directly (or via the Authentication provider) to the desired target system identity (A) and gets a unique OTP, for example, 1234. When the User\Device100 sends the OTP key 1234 to OTP generator and validator server 107 for validating, the validation process first validates the pattern, as described in previous use cases examples. At this point, all the systems A, B, C . . . N are able to validate the OTP and the source SID it was generated from.

The second step is to compare the Source SID (A) with the actual system ID and approve access only when there is a match.

The uniqueness in this approach is that the system identity may be changed to any identity included in the shared logic pattern, that if system A changes its identity to D, it will be able to validate and approve any OTP key generated from a request that uses D as the SID.

The shared logic of client-side105 or server-side107 or both may be changed independently from one another, as long as there is any overlapping between them.

What is claimed is:

1. A computer-implemented method for generating multiple valid OTP (One Time Password) for a single identity using a shared logic, the method comprising
using an OTP solution based on the shared logic generating and validating multiple valid OTPs configured to transfer additional info in a OTP validation process;
dynamically changing the shared logic in a OTP client and/or in a OTP server if there is a logic overlapping in the shared logic, a moving factor value, and one or more rules addressed by a rules-based engine;
using the OTP solution for one or more distributed disconnected environments only if the shared logic, the moving factor value, and the one or more rules addressed by the rules-based engine are each overlapping;
using valid OTP for non-valid requests with one or more dedicated custom actions supporting complex business use cases, wherein the one or more dedicated custom actions comprise redirecting an attacker to a sandbox instead of a desired target after fake successful authentication, raising an alert, and requesting additional data to approve authentication;
using recursively an OTP generation process output in another OTP generation process input creating a derived chained OTP defined by the shared logic being known to both the OTP generation process and the OTP server, wherein the OTP generation process output and the OTP server are synchronized each time a respective OTP is validated; and
implementing a contextual authorization business use case in which a shared secret of the shared logic is affected by a risk score and by a risk score ID at least partially combined with a static value.

2. The method of claim 1, wherein the one more dedicated custom actions supporting complex business use cases comprise at least a OTP honeypot.

3. The method of claim 1, wherein the shared logic comprises different built-in data arguments comprising the OTP solution according to a time-based one-time password (TOTP) and/or one-time password algorithm (HOTP).

4. The method of claim 3, wherein the shared logic comprises a plurality of Iterations defining a plurality of derived chained OTP recursion levels; and wherein the shared logic is configured to be expanded with additional factors and/or enhance existing factors.

5. The method of claim 1, wherein the shared logic comprises a plurality of Iterations defining a plurality of derived chained OTP recursion levels.

6. The method of claim 1, wherein the shared logic is configured to be expanded with additional factors and/or enhance existing factors.

7. The method of claim 1, wherein a definition of the shared logic and one or more actions performed upon successful specific OTP validation defined in the rule-based engine do not require any changes to a multi-factor authentication and/or the OTP solution apart from integration.

8. The method of claim 1, wherein there is a distinction between the OTP validation process, an OTP authentication process of the operations, and the one or more dedicated custom actions, whereas a successful validation of the OTP validation process results in an authentication denied output.

9. A system for generating multiple valid OTP (One Time Password) using a shared logic, the system comprising:
at least one data processor;
memory storing instructions that when executed by at least one data processor, performing operations comprising:
using an OTP solution based on the shared logic generating and validating multiple valid OTPs configured to transfer additional info in a OTP validation process;
dynamically changing the shared logic in a OTP client and/or in a OTP server if there is a logic overlapping in the shared logic, a moving factor value, and one or more rules addressed by a rules-based engine;
using the OTP solution for one or more distributed disconnected environments only if the shared logic, the moving factor value, and the one or more rules addressed by the rules-based engine are overlapping;
using valid OTP for non-valid requests with one or more dedicated custom actions supporting complex business use cases, wherein the one or more dedicated custom actions comprise redirecting an attacker to a sandbox instead of a desired target after fake successful authentication, raising an alert, and requesting additional data to approve authentication;
using recursively an OTP generation process output in another OTP generation process input creating a derived chained OTP defined by the shared logic being known to both the OTP generation process and the OTP server, wherein the OTP generation process output and the OTP server are synchronized each time a respective OTP is validated; and
implementing a contextual authorization business use case in which a shared secret is affected by a risk score and/or by a risk score identification (ID) fully or partially combined with a static value.

10. The system of claim 9, wherein the operations further comprise supporting password rotation business use case.

11. The system of claim 9, wherein the one more dedicated custom actions supporting complex business use cases comprise at least a OTP honeypot.

12. The system of claim 9, wherein the shared logic comprises different built-in data arguments comprising the OTP solution according to a time-based one-time password (TOTP) and/or one-time password algorithm (HOTP).

13. The system of claim 12, wherein the shared logic comprises a plurality of Iterations defining a plurality of derived chained OTP recursion levels.

14. The system of claim 12, wherein the shared logic is configured to be expanded with additional factors and/or enhance existing factors.

15. The system of claim 9, wherein the shared logic comprises a plurality of Iterations defining a plurality of derived chained OTP recursion levels.

16. The system of claim 9, wherein the shared logic is configured to be expanded with additional factors and/or enhance existing factors.

17. The system of claim 9, wherein a definition of the shared logic and one or more actions performed upon successful specific OTP validation defined in the rule-based engine do not require any changes to a multi-factor authentication and/or the OTP solution apart from integration.

18. The system of claim 9, wherein a definition of the shared logic and one or more actions performed upon unsuccessful specific OTP validation defined in the rule-based engine do not require any changes to a multi-factor authentication and/or the OTP solution apart from integration.

19. The system of claim 9 wherein there is a distinction between the OTP validation process, an OTP authentication process of the operations, and the one or more dedicated custom actions, whereas a successful validation of the OTP validation process results in an authentication denied output.

20. The system of claim 9, wherein the step of using the OTP solution based on shared logic generating and validating multiple valid OTPs that are capable of transferring additional info in the OTP validation process other than Boolean.

21. A non-transitory computer-readable medium storing instructions that, when executed by a processor, cause the processor to perform a method for generating multiple valid OTP (One Time Password), the method comprising:
using an OTP solution based on a shared logic generating and validating multiple valid OTPs that are capable of transferring additional info in a OTP validation process;
independently changing the shared logic in a OTP client and/or in a OTP server only if there is a logic overlapping in the shared logic, a moving factor value of each OTP based on a counter, and one or more rules addressed by a rules-based engine;
using the OTP solution for one or more distributed disconnected environments only if the shared logic, the moving factor value, and the one or more rules addressed by the rules-based engine are overlapping;
using valid OTP for non-valid requests with one or more dedicated custom actions supporting complex business use cases, wherein the one or more dedicated custom actions comprise redirecting an attacker to a sandbox instead of a desired target after fake successful authentication, raising an alert, and requesting additional data to approve authentication;
using recursively an OTP generation process output in another OTP generation process input creating a derived chained OTP defined by the shared logic being known to both the OTP generation process and the OTP server, wherein the OTP generation process output and the OTP server are synchronized each time a respective OTP is validated; and
implementing a contextual authorization business use case in which a shared secret of the shared logic is affected by a risk score and by a risk score identification (ID) in combination with a static value.

* * * * *